(12) United States Patent
Tiong

(10) Patent No.: US 6,378,074 B1
(45) Date of Patent: Apr. 23, 2002

(54) METHOD FOR SECURITY PARTITIONING OF A COMPUTER SYSTEM

(75) Inventor: Chan Nai Tiong, Singapore (SG)

(73) Assignee: Sentry Technologies Pte Ltd, Singapore (SG)

(*) Notice: Subject to any disclaimer, the term of this patent is extended or adjusted under 35 U.S.C. 154(b) by 0 days.

(21) Appl. No.: 09/166,391

(22) Filed: Oct. 5, 1998

(51) Int. Cl.[7] ............ G06F 13/00; G06F 11/30; G06F 1/28; G06F 1/26; G06F 1/30

(52) U.S. Cl. ............ 713/200; 710/104; 710/302; 710/304; 713/300; 713/310; 713/323; 713/340

(58) Field of Search .............. 700/40, 12, 5; 707/9; 710/102, 103, 27, 8, 108, 113, 131, 104, 302, 304; 709/210, 215, 209; 712/43, 13, 153, 173; 713/201, 323, 300, 310, 340

(56) References Cited

U.S. PATENT DOCUMENTS

| | | | |
|---|---|---|---|
| 4,685,056 A | | 8/1987 | Barnsdale, Jr. et al. ..... 364/200 |
| 4,941,086 A | * | 7/1990 | Kriz ............ 712/153 |
| 5,434,562 A | | 7/1995 | Reardon ........... 712/153 |
| 5,483,649 A | | 1/1996 | Kuznetsov et al. ..... 395/186 |
| 5,504,909 A | * | 4/1996 | Webster et al. ...... 713/304 |
| 5,542,044 A | | 7/1996 | Pope ............ 395/186 |
| 5,550,984 A | | 8/1996 | Gelb ........... 395/200.17 |
| 5,623,601 A | | 4/1997 | Vu ............ 395/187.01 |
| 5,778,174 A | | 7/1998 | Cain ........... 395/187.01 |
| 6,128,682 A | * | 10/2000 | Humpherys et al. ..... 713/300 |
| 6,138,181 A | * | 10/2000 | Aida et al. ........ 713/304 |
| 6,304,976 B1 | * | 10/2001 | Kim ............ 713/304 |

FOREIGN PATENT DOCUMENTS

| EP | 0689 690 B1 | * | 3/1996 |
|---|---|---|---|
| EP | WO 00/20949 | * | 4/2000 |

OTHER PUBLICATIONS

International Publication No. WO98/25372, Date Jun. 11, 1998.
International Application # PCT/IL97/00380, Date Nov. 20, 1997.

* cited by examiner

Primary Examiner—Gail Hayes
Assistant Examiner—Jenise Jackson
(74) Attorney, Agent, or Firm—George O. Saile; Stephen B. Ackerman

(57) ABSTRACT

This invention describes a method for providing data security in a computer by creating computing modes between which there are no data communications. Each mode has its own hard disk drives, networks connections and phone line connections. A buss isolation unit connects each disk drive to a disk interface unit when enabled by its selection signal. An isolation unit connected to the computer is programmed with the various computing modes. The isolation unit provides power to the disk drives and mode selection signals to the bus isolation units as dictated by the selected computing mode. The isolation unit selects the networks and phone lines to be connected to the computer as required by the selected computing mode. To change computing modes the computer must first be powered off to insure that residual data is not carried over to the subsequent mode. Then the new mode is selected and the computer is powered back on.

19 Claims, 5 Drawing Sheets

METHOD FOR SECURITY PARTITIONING OF A COMPUTER SYSTEM

BACKGROUND OF THE INVENTION

1. Field of Invention

This invention is related to computer systems and in particular maintaining integrity and security of computer networks and data stored on a computer.

2. Description of Related Art

Computers connected to more than one network provide a way for hackers to gain access to other networks connected to the computer and to the data stored in the computer. The hacker generally enters through a lower security network and gains access to a higher security network. A hacker can also gain access to a computer through the Internet. This can allow the hacker to erase or copy stored data.

In U.S. Pat. No. 5,778,174 (Cain) a system is disclosed for providing a secured access to a server connected to a private computer network protected by a router acting as a firewall. The system isolates a public and private network from one another. In U.S. Pat. No. 5,623,601 (Vu) an apparatus and method for providing a secure firewall between a private and public network is discussed. The method produces a transparent firewall with application level security and data screening capability. In U.S. Pat. No. 5,550,984 (Gelb) a security system is disclosed in which two mother boards with network adapters are used to communicate with separate networks. The two mother boards communicate with each other through a transfer adapter and network interface adapter.

In U.S. Pat. No. 5,542,044 (Pope) a computer security device is disclosed having a main and auxiliary storage device. A method for isolating the main and auxiliary storage is described, and the main storage area can be partitioned between a safe storage area and a working area. In U.S. Pat. No. 5,483,649 (Kuznetsov et al) a computer security system is provided by controlling access to the hard disk controller only through a path using the computers operating system, a modular device driver and the basic input/output system. In U.S. Pat. No. 4,685,056 (Barnsdale et al.) a computer security system is discussed in which a buss is monitored for unauthorized commands or data. Upon detection of unauthorized commands or data, DC power can be disrupted to selected computing devices which are wanted to be protected.

It is usually not practical to isolate all important data resources stored on hard disks in a computer system from outside influences all the time. However, it is practical to make available only those data resources that are needed when connecting to external networks and phone lines, and including connecting only to those networks and Internet providers that are required during a particular computing session. In the process of making some data resources available, the data resources not made available needs to be protected in such away that the active data and networks can not gain access in any way.

SUMMARY OF THE INVENTION

The objective of this invention is to keep data on hard disks and computer network connections not accessible when not being used. In this invention a computer is operated in two or more modes. Data stored in the computer in one mode is not accessible when the computer is operated in another mode. Similarly a computer network connected in one mode is not accessible in another mode. To accomplish this a computing system is connected to an isolation unit which controls selection of the hard disk drives in the system and controls the connection to external communication lines such as networks and phone lines. The isolation unit contains a control unit in which different computing modes are programmed. Each computing mode selects one or more disk drives by connecting power to the selected drives, and connecting the selected drives to the disk drive interface through the associated buss interface unit (BIU). The BIU associated with the unselected disk drives disconnects the disk drives from the disk drive interface to prevent the unselected disk drives from loading and interfering with signals on the disk drive interface. The connection of external communication lines, including networks and telephone lines, is also controlled by the various modes programmed into the isolation unit. Only those data resources (hard disks, networks and telephone lines) needed for a particular computing mode are powered on and connected to the computing system.

The isolation unit detects when the computer system is powered on or off. When the computer is powered on a computing mode cannot be changed in the isolation unit. The power to the computer must first be turned off and then a new computing mode can be selected. This prevents residual data in main memory, for instance, from being carried over to the new computing mode and the attendant data. Each computing mode powers on at least one hard disk drive and may be connected to one or more external communication lines.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
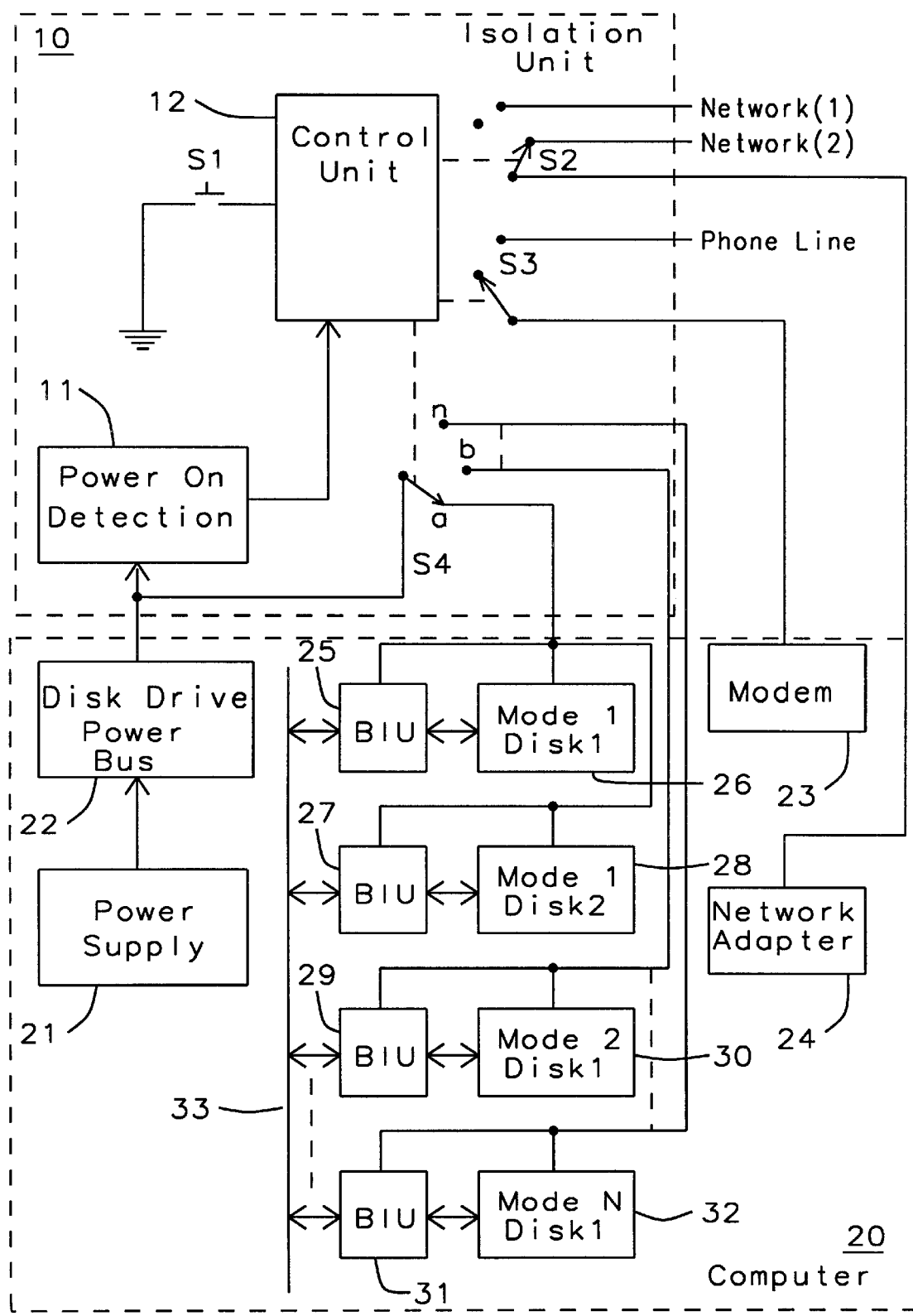
FIG. 1 is a block diagram of the data security system of this invention.

Referring to FIG. 1, an isolation unit 10 is connected to a computer 20. A power supply 21 is connected to a disk drive power bus 22 in the computer 20. The disk drive power bus 22 is connected to a power on detection circuit 11 and switch S4 in the isolation unit 10. The power on detection circuit 11 is connected to the control unit 12 and provides a signal that tells the control unit that the computer 20 is powered on or off. If the computer 20 is off, a computing mode can be manually selected in the control unit 12 by selecting the mode select switch S1. The selected computing mode controls switches S2, S3 and S4. Switch S2 chooses which network to connect to the network adapter 24, and switch S3 connects a telephone line to a modem 23 in the computer 20. Switch S4 connects power to at least one hard disk drive 26 28 30 32 and its BIU 25 27 29 31. The power to BIU 25 27 29 31 serves as mode selection signals. When the computer power is turned on, the mode selection made manually with switch S1 during power off of the computer connects power to the disk drives selected for the particular mode, connects the selected disk drives to the disk drive interface 33, may connect a network to the network adapter 24 and may connect a telephone line to the modem 23.

Continuing to refer to FIG. 1, mode (1) disk (1) 26 and mode (1) disk (2) 28 including BIU 25 and 27 are connected to mode switch S4, position (a). Mode (2) disk (1) 30 and BIU 29 are connected to mode switch S4, position (b), and mode (N) disk (1) 32 and BIU 31 are connected to mode switch S4, position (n). The BIU's 25 27 29 31 are connected to the disk drive interface 33. When the BIU's 25 27 29 31 are enabled by respective mode selection signals, the BIU's connect the disk drive interface 33 to the powered on disk drives 26 28 30 32. The total number of disk drives is different than the total number of modes, represented by N, by the number of multiple disk drives connected to each computing mode.

An example of the results of selecting a mode can be seen from the connectivity in FIG. 1. When the computer 20 is powered off, mode (1) is manually selected using switch S1 connected to the control unit 12. Selecting mode (1) sets switch S2 to selects network (2) to be connected to the network adapter 24 and switch S3 to not connect a telephone line to the modem 23. Switch S4 connects the disk drive power buss 22 to disk (1) 26, disk (2) 28, and to BIU's 25 and 27. When the computer is powered on, it is brought up in mode (1) with hard disk drives (1) and (2) brought up and connected to the system through BIU's 25 and 27. There is no phone line connected to the modem 23 and network (2) is connected to the network adapter. In order to connect to a phone line and network (1) to the computer, the computer 20 must be powered off and a new mode selected in the isolation unit 10 that connects the phone line to the modem and the network (1) to the network adapter. This new mode will also select disk drives that may be different from the previous mode.

Figure 2:
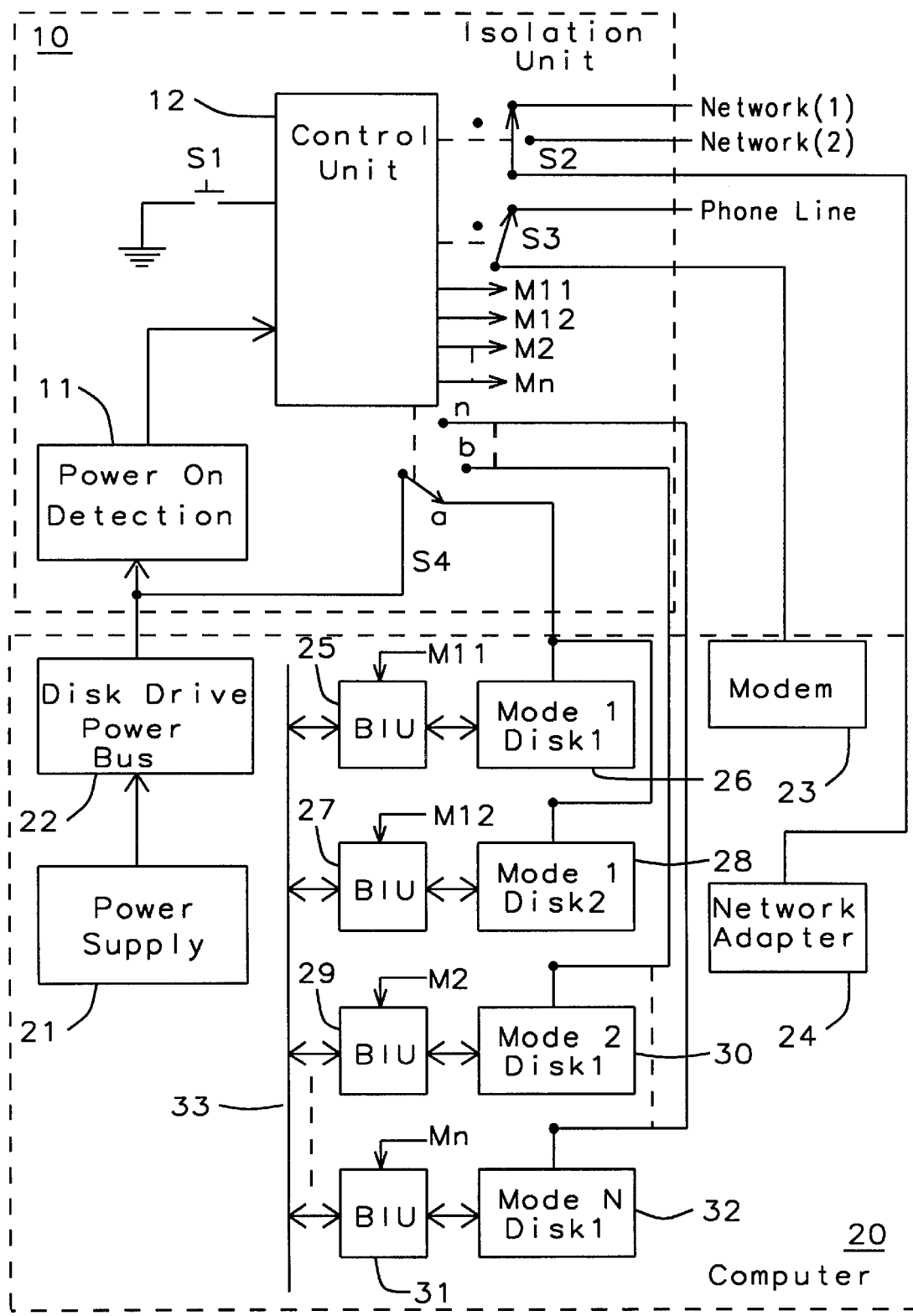
FIG. 2 is a block diagram of an alternate embodiment of the data security system of this invention.

In FIG. 2 is shown an alternate embodiment of the data security system of this invention. As shown in FIG. 1, an isolation unit 10 is connected to a computer 20. A power supply 21 is connected to a disk drive power bus 22 in the computer 20. The disk drive power bus 22 is connected to a power on detection circuit 11 and switch S4 in the isolation unit 10. The power on detection circuit 11 is connected to the control unit 12 and provides a signal that tells the control unit that the computer 20 is powered on or off. If the computer 20 is off, a computing mode can be manually selected in the control unit 12 by selecting the mode select switch S1. The selected computing mode controls switches S2, S3 and S4. Switch S2 chooses which network to connect to the network adapter 24, and switch S3 connects a telephone line to a modem 23 in the computer 20. Switch S4 connects power to at least one hard disk drive 26 28 30 32.

Continuing to refer to FIG. 2, mode selection signals M11, M12, M2, and Mm are generated by the control unit 12 and connect to BIU 25 27 29 31. The mode selection signals select BIU's corresponding to the selected hard disk drives 26 28 30 32. M11 and M12 enable BIU's 25 and 27 for mode (1) computing and connect hard drive (1) 26 and hard drive (2) to the disk drive interface. M2 enables BIU 29 and connects disk (1) for mode (2) to the disk drive interface 33. In like manner Mn enables BIU 31 and connects disk (1) for mode (N) to the disk drive interface 33. Although not generally desirable, being able to logically disable a disk drive while powered on can be important in some instances. With the ability to select BIU's separate from the hard disk drives, a disk drive that is powered on could be disconnected from the disk drive interface 33 thereby disabling communications to and from the disk drive without powering it off or other disk drives enabled in the particular computing mode. A possible example of this can be observed from FIG. 2 where in mode (1) both disk (1) 26 and disk (2) 28 are powered on by switch S4 and BIU 25 and 27 are enabled by mode selection signals M11 and M12. If it were necessary and if the control unit 12 were properly configured, either disk (1) or disk (2) could be logically disabled without powering either disk drive down by making a selection in the isolation unit 10 to turn off mode selection signal M11 to disable disk drive (1) or M12 to disable disk drive (2).

An example of the results of selecting a mode can be seen from the connectivity in FIG. 2. When the computer 20 is powered off, mode (1) is manually selected using switch S1 connected to the control unit 12. Selecting mode (1) sets switch S2 to selects network (1) to be connected to the network adapter 24 and switch S3 to connect a telephone line to the modem 23. Switch S4 connects the disk drive power buss 22 to disk (1) 26, disk (2) 28. Mode selection signals M11 and M12 are activated to connect mode (1) disk (1) and mode (1) disk (2) to the disk drive interface 33 through BIU's 25 and 27. When the computer is powered on, it is brought up in mode (1) with hard disk drives (1) and (2) brought up and connected to the system through BIU's 25 and 27. A phone line is connected to the modem 23 by switch S3 and network (1) is connected to the network adapter 24.

Figure 3:
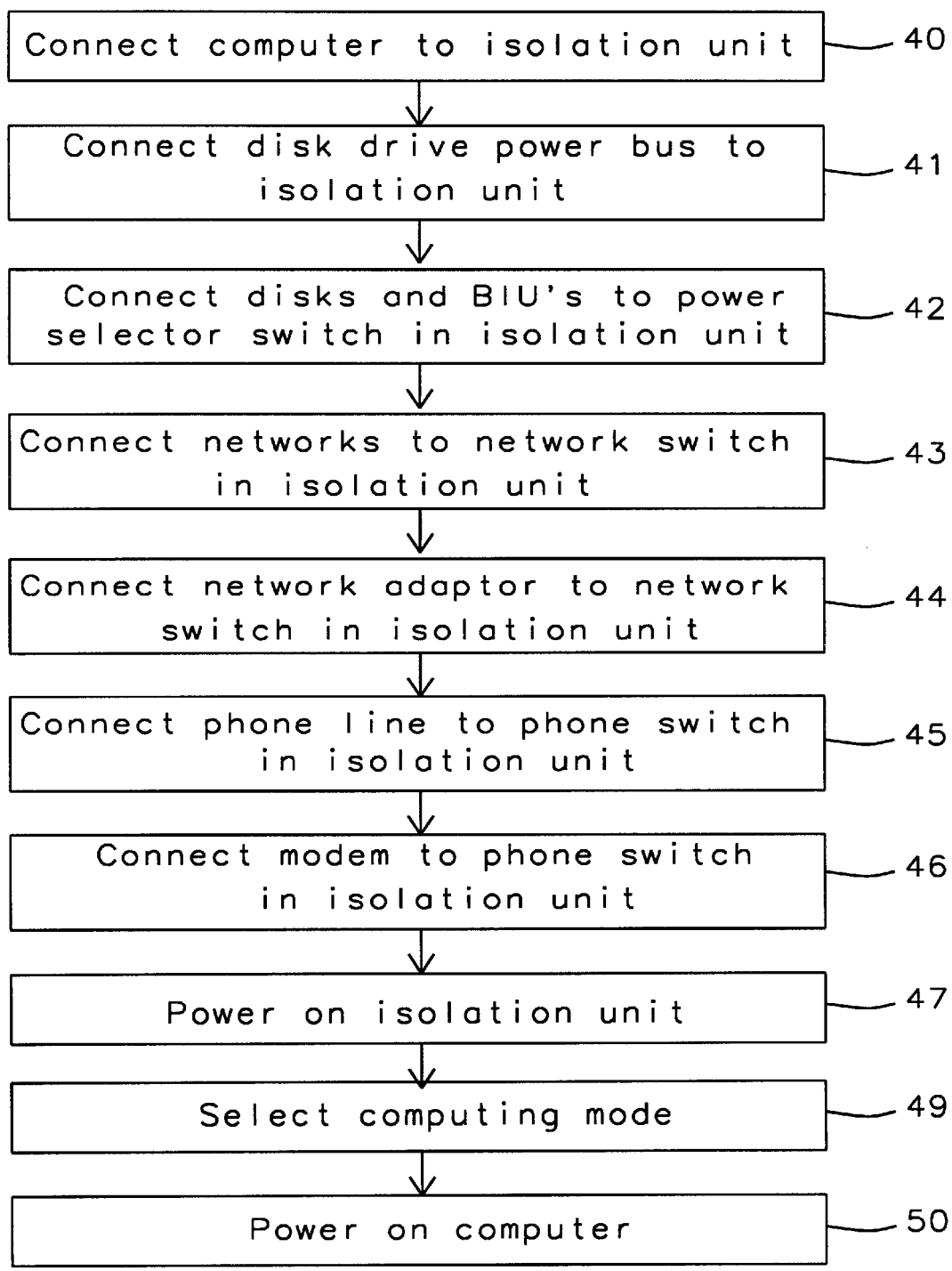
FIG. 3 is a flow diagram of the method of connecting the isolation unit to a computer and powering on the computer in a computing mode.

Referring to FIG. 3, a method is shown for connecting the computer 20 to the isolation unit 10 using the circuit diagram of FIG. 1. The computer is connected to the isolation unit 40, and the disk drive power bus is connected to the power on detection circuit 11 and switch S4 in the isolation unit 41. The disk drives and BIU's in the computer are connected to the power selector switch S4 in the isolation unit 42. Networks are connected to the network switch S2 in the isolation unit 43, and the network adapter in the computer is connected to the network switch S2 in the isolation unit 44. The telephone line is connected to the phone switch S3 in the isolation network 45, and the modem 23 is connected to the phone line switch in the isolation unit 46. After all connections are made, the isolation unit is powered on 47. The desired computing mode is selected 49, and the computer is powered on 50. The computer is brought up in the selected computing mode with only the selected disk drives powered on and only the selected networks and phone line connections made. The powering of the hard disk drives and the BIU's through the selector switch S4 provides the enabling signal to connect drives to the disk interface bus.

Figure 4:
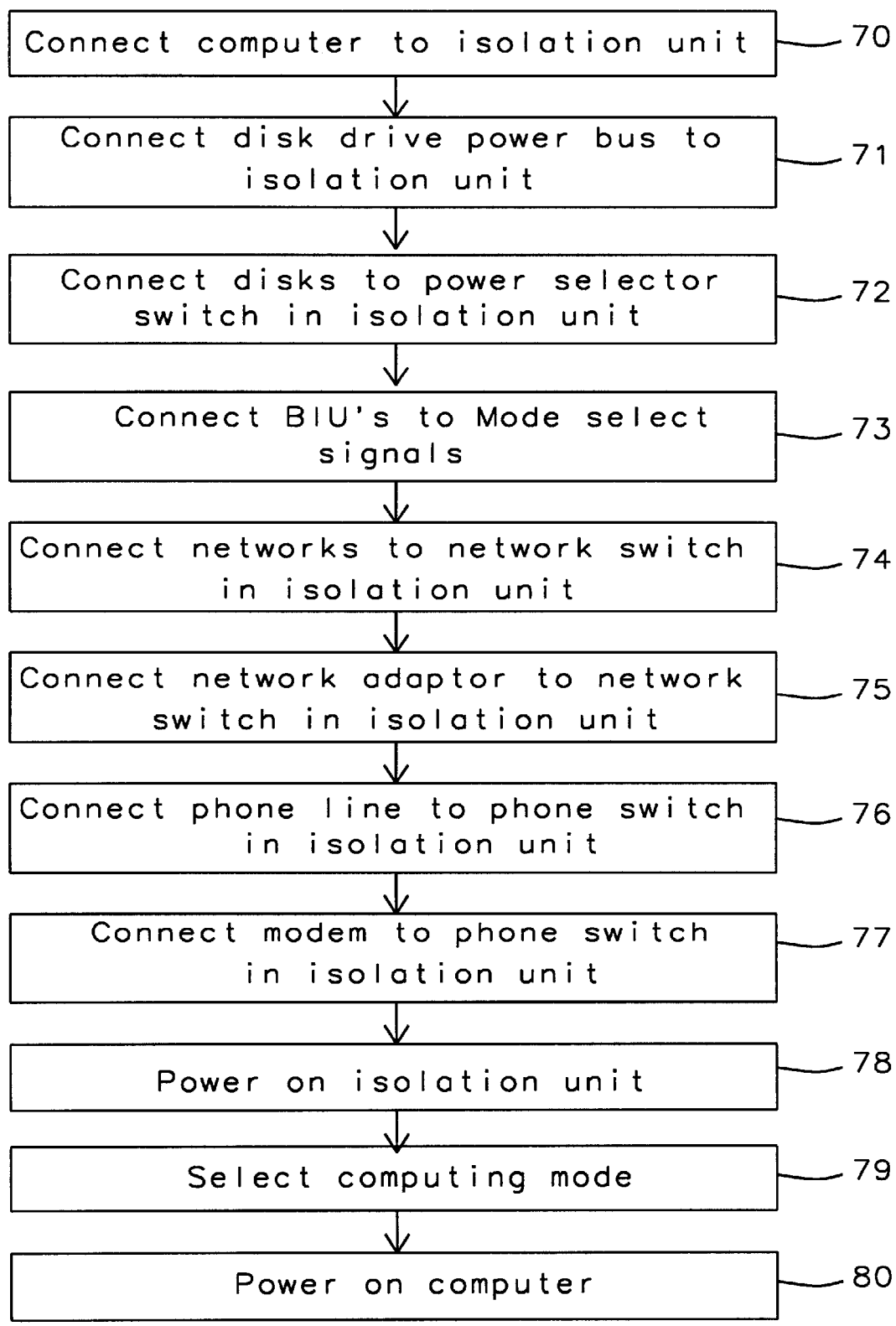
FIG. 4 is a flow diagram of an alternate embodiment of the method of connecting the isolation unit to a computer and powering on the computer in a computing mode.

Referring to FIG. 4, a method is shown for connecting the computer 20 to the isolation unit 10 using the circuit diagram of FIG. 2. The computer is connected to the isolation unit 70, and the disk drive power bus 22 is connected to the power on detection circuit 11 and switch S4 in the isolation unit 71. The disk drives in the computer are connected to selector switch S4 in the isolation unit 72. The BIU's in the computer are connected to mode select signals of the control unit inside the isolation unit 73. Networks are connected to the network switch S2 in the isolation unit 74, and the network adapter in the computer is connected to the network switch S2 in the isolation unit 75. The telephone line is connected to the phone switch S3 in the isolation unit 76, and the modem 23 is connected to the phone line switch in the isolation unit 77. After all connections are made, the isolation unit is powered on 78. The desired computing mode is selected 79, and the computer is powered on 80. The computer is brought up in the selected computing mode with only the selected disk drives enabled and only the selected networks and phone line connections made. The hard disk drives are powered through the selector switch S4 separately from the BIU's. The BIU's are enabled by the mode select signals from the control unit within the isolation unit. This can allow disk drives to be logically disabled without powering them down.

Figure 5:
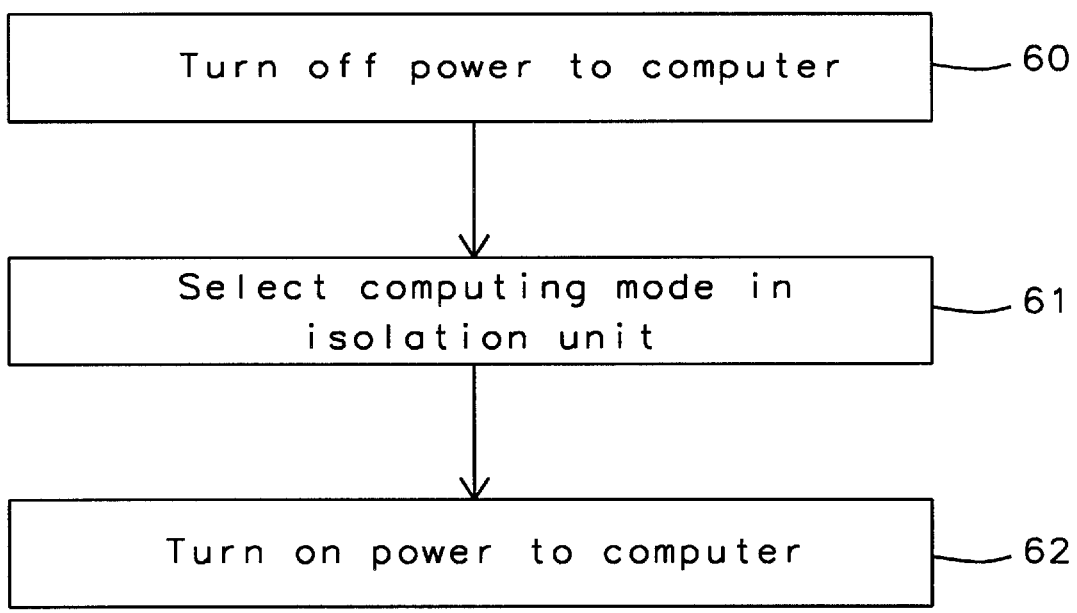
FIG. 5 is a flow diagram of the method of selecting a different computing mode.

Referring to FIG. 5, a method is shown for changing the computing mode. Power is turned off to the computer 60 and a new computing mode is selected 61 using the selector switch S1 in the isolation unit 10. After the new mode has been selected, power is turned back on to the computer 62. This procedure of turning the computer power off before selecting a new mode insures that all residual data in memory are erased before the new mode is established on the computer 20, and insures isolation of data between computing modes.

While the invention has been particularly shown and described with reference to preferred embodiments thereof it will be understood by those skilled in the art that various changes in form and details may be made without departing from the spirit and scope of the invention.

What is claimed is:

1. A method of selecting another computing mode, comprising:
    a) turning off power to a computer connected to an isolation unit, then
    b) selecting a computing mode in said isolation unit, then
    c) turning on power to said computer.

2. The method in claim 1, wherein:
    a) said computer contains at least one internal communication means,
    b) selecting said computing mode also selects or deselects the said external communication.

3. The method of claim 1, wherein selecting a computing mode is a manual operation performed after said isolation unit detects said computer power is off.

4. A computer security system, comprising:
    a) a computer system with data elements comprising a plurality of hard disk drives and a means for external communications,
    b) an isolation unit communicates with said computer system,
    c) said isolation unit programmed to provide a plurality of computing modes,
    d) said computing modes enable selected hard disk drives within said computer system and selected external communication to and from said computer system,
    e) said isolation unit maintains isolation between computing modes by insuring data content of main memory from a first computing mode is not available to a second computing mode,
    f) said isolation unit detects power status of said computer system and prevents computing modes from being changed when said computing system is powered on.

5. The computer security system of claim 4, wherein said hard disk drive enabled by said isolation unit communicates with a hard disk drive interface of said computing system, and a hard disk drive that is not enabled does not communicate with said hard disk drive interface.

6. The computer security system of claim 4, wherein a computing mode of said plurality of computing modes is selected when said computing system is powered off and said computing mode enables one or more hard disk drives when said computing system is powered on.

7. The computer security system of claim 4, wherein a computing mode of said plurality of computing modes selects an external network when said computer is powered off and allows said external network to communicate with said computer system when said computing system is powered on.

8. The computer security system of claim 4, wherein a computing mode of said plurality of computing modes selects a telephone line when said computer is powered off and allows said telephone line to communicate with a modem of said computer system when said computing system is powered on.

9. The computer security system of claim 4, wherein a computing mode of said plurality of computing modes is selected when said computing system is powered off which does not allow any external communications to communicate with said computing system when said computer system is powered on.

10. The computer security system of claim 4, wherein a first computing mode is replaced by a second computing mode in said isolation unit when the isolation unit detects said computer system is powered off.

11. A security system for a computer, comprising:
    a) a computer with a plurality of hard disk drives,
    b) said computer contains external communication interfaces comprising one or more network adapters, modems and serial I/O interfaces,
    c) an isolation unit containing a plurality of computing modes communicates with said computer,
    d) said isolation unit communicating with a plurality of switches controlling a connection of a plurality of external communication lines to said computer and comprising computer networks and phone lines,
    e) said external communication lines communicate with said external communication interfaces of said computer by means of switches controlled by a selected computing mode,
    f) said isolation unit detects the computer power and allows the computing mode to be changed only when the computer is powered off,
    g) said isolation unit detects the computer power and enables said selected computing mode that allows selected hard drives and selected external communications to communicate with said computer when the computer is powered on.

12. The computer security system of claim 11, wherein a hard disk drive enabled by said selected computing mode communicates with a hard disk drive interface of said computing system, and a hard disk drive that is not enabled does not communicate with said hard disk drive interface.

13. The security system of claim 11, wherein one or more hard disk drive can be enabled by said isolation unit within a computing mode when said isolation unit detects that the computer is powered on.

14. The security system of claim 11, wherein selection of a computing mode is selected when said computer is powered off, preventing previous data in memory from being available to said computing mode.

15. The security system of claim 11, wherein hard disk drives not enabled by a computing mode in said isolation unit are isolated from said computing system.

16. A method to establish security control in a computing system, comprising:
    a) connecting a computer to an isolation unit containing a plurality of computing modes,
    b) connecting a disk drive power buss of said computer to a mode selector of said isolation unit controlled by a selected computing mode, c) connecting hard disk drives of said computer to said mode selector of said isolation unit, d) connecting bus isolation units of said computer to mode selector of said isolation unit, e) connecting external communication interfaces of said computer to communication selector in said isolation unit, f) connecting external communication lines to said communication selector in said isolation unit, g) powering on said isolation unit, then h) detecting computer power off by said isolation unit, then selecting a computing mode, then powering on said computer and then operating said computer in said selected computing mode.

17. The method of claim 16, wherein connecting bus isolation units of said computer to said mode selector of said isolation unit allows said isolation unit to select disk drives when power to said computer is off and to activate selected disk drives when computer power is detected to be on by said isolation unit.

18. The method of claim 16, wherein selecting said computer mode selects combinations of hard disks and external communication connections to satisfy a computing requirement while isolating data on hard disks and networks that are not selected by said computing mode.

19. The method of claim 16, wherein bus isolation units connected to hard disk drives and selected by a computing mode are enabled by said isolation unit when computer power is on to connect said selected hard disk drives to a disk drive interface in said computer, whereas bus isolation units connected to hard disk drives not selected by said computing mode are not enabled.

* * * * *

UNITED STATES PATENT AND TRADEMARK OFFICE
CERTIFICATE OF CORRECTION

PATENT NO.        : 6,378,074 B1
APPLICATION NO. : 09/166391
DATED             : April 23, 2002
INVENTOR(S)       : Nai Tiong Chan Page 1 of 1

It is certified that error appears in the above-identified patent and that said Letters Patent is hereby corrected as shown below:

On Title Page Item (75)
In the Inventors, delete inventor, "Chan Nai Tiong, Singapore (SG)" and replace with --Nai Tiong Chan, Singapore (SG) --.

Signed and Sealed this

Twentieth Day of February, 2007

JON W. DUDAS
*Director of the United States Patent and Trademark Office*